United States Patent
Rumyantsev et al.

(10) Patent No.: US 9,804,998 B2
(45) Date of Patent: Oct. 31, 2017

(54) UNIFIED COMPUTATION SYSTEMS AND METHODS FOR ITERATIVE MULTIPLICATION AND DIVISION, EFFICIENT OVERFLOW DETECTION SYSTEMS AND METHODS FOR INTEGER DIVISION, AND TREE-BASED ADDITION SYSTEMS AND METHODS FOR SINGLE-CYCLE MULTIPLICATION

(75) Inventors: Alexander Sergeevich Rumyantsev, Saint-Petersburg (RU); Dmitri Yurievich Pavlov, Saint-Petersburg (RU); Alexander Nikolayevich Redkin, Saint-Petersburg (RU); Daniil Valentinovich Demidov, Saint-Petersburg (RU); Dmitry Anatolievich Gusev, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 13/976,358

(22) PCT Filed: Nov. 29, 2011

(86) PCT No.: PCT/RU2011/000935
§ 371 (c)(1),
(2), (4) Date: Oct. 22, 2013

(87) PCT Pub. No.: WO2013/081484
PCT Pub. Date: Jun. 6, 2013

(65) Prior Publication Data
US 2014/0046996 A1  Feb. 13, 2014

(51) Int. Cl.
*G06F 17/10* (2006.01)
*G06F 7/52* (2006.01)
(Continued)

(52) U.S. Cl.
CPC ............... *G06F 17/10* (2013.01); *G06F 7/52* (2013.01); *G06F 7/535* (2013.01); *G06F 7/5338* (2013.01)

(58) Field of Classification Search
None
See application file for complete search history.

(56) References Cited

U.S. PATENT DOCUMENTS 5,615,113 A * 3/1997 Matula .................... G06F 7/535
                                                    708/525
5,675,528 A   10/1997 Matula
(Continued)

OTHER PUBLICATIONS

International Search Report and Written Opinion, dated Aug. 16, 2012, 9 pages, International Application No. PCT/RU2011/000935, Russian Intellectual Property Office, Moscow, Russia.

*Primary Examiner* — Michael D Yaary
(74) *Attorney, Agent, or Firm* — Nicholson De Vos Webster & Elliott, LLP

(57) ABSTRACT

A unified computation unit for iterative multiplication and division may include an architecture having a unified integer iterative multiplication and division circuit. A method may include a device receiving a dividend and a divisor for a division operation, separating the dividend into two parts based on the determining, and evaluating whether an overflow situation exists based on the two parts. A single-cycle multiplication unit may include a multi-operand addition schema for partial products compression that implements tree-based addition methods for single-cycle multiplication operations.

24 Claims, 14 Drawing Sheets

(51) Int. Cl.
  *G06F 7/535*  (2006.01)
  *G06F 7/533*  (2006.01)

(56) References Cited

U.S. PATENT DOCUMENTS

| | | | |
|---|---|---|---|
| 6,065,033 A | 5/2000 | Jouppi | |
| 7,584,237 B1 * | 9/2009 | Tan | G06F 7/49936 708/650 |
| 2002/0156823 A1 | 10/2002 | Weng et al. | |
| 2004/0128337 A1 * | 7/2004 | Roussel | G06F 7/535 708/650 |

* cited by examiner

UNIFIED COMPUTATION SYSTEMS AND METHODS FOR ITERATIVE MULTIPLICATION AND DIVISION, EFFICIENT OVERFLOW DETECTION SYSTEMS AND METHODS FOR INTEGER DIVISION, AND TREE-BASED ADDITION SYSTEMS AND METHODS FOR SINGLE-CYCLE MULTIPLICATION

TECHNICAL FIELD

The disclosed technology relates generally to circuits and systems and, more particularly, to devices and systems designed to perform various types of arithmetic operations including multiplication and division.

BACKGROUND

Integer multiplication and division operations are generally some of the most costly operations in modern processors, as multiplication and division operations usually have the longest execution times among all basic integer arithmetic operations. To reduce execution time for single-cycle multiplication operations with high-radix Booth encoders, current systems typically rely on Wallace/Dadda tree implementations that incorporate a final adder. Although division operations are usually less common than addition and multiplication operations, there are many important areas that utilize division operations such as rendering systems, artificial intelligence, algorithms, data compression, etc.

Using a larger basis for the division on the basis of repetition is one way to accelerate the operation of division, but this approach increases the complexity of hardware implementation and, consequently, leads to an increase in footprint, power consumption and price/performance ratio. To date, there have been a number of approaches to implementing division on a large scale, but aspects of these implementations remain unexplored, particularly with regard to effective area and power consumption concerning overflow situations.

Current systems generally use separate lines and, in some cases, separate components for multiplication operations than they do for division operations. Such arrangements can be problematic, particularly with regard to the individual and/or total footprint, i.e., physical area, that is required by the components used in the design. Further, the power consumption of the components is often significant.

BRIEF DESCRIPTION OF THE DRAWINGS

Embodiments of the disclosed technology are illustrated by way of example, and not by way of limitation, in the drawings and in which like reference numerals refer to similar elements.

DETAILED DESCRIPTION

Embodiments of the disclosed technology include the use of a normalization block for dividend and divisor, methods of determining situations during division that lead to an overflow condition, architecture of a joint integer radix-4 multiplication and division circuit, and tree-based addition techniques for single-cycle multiplication operations. Embodiments may be suitable for 2N-bit-to-N-bit unsigned and signed integer division and N-bit-to-N-bit unsigned and signed integer multiplication in radix-4, for example.

Figure 1:
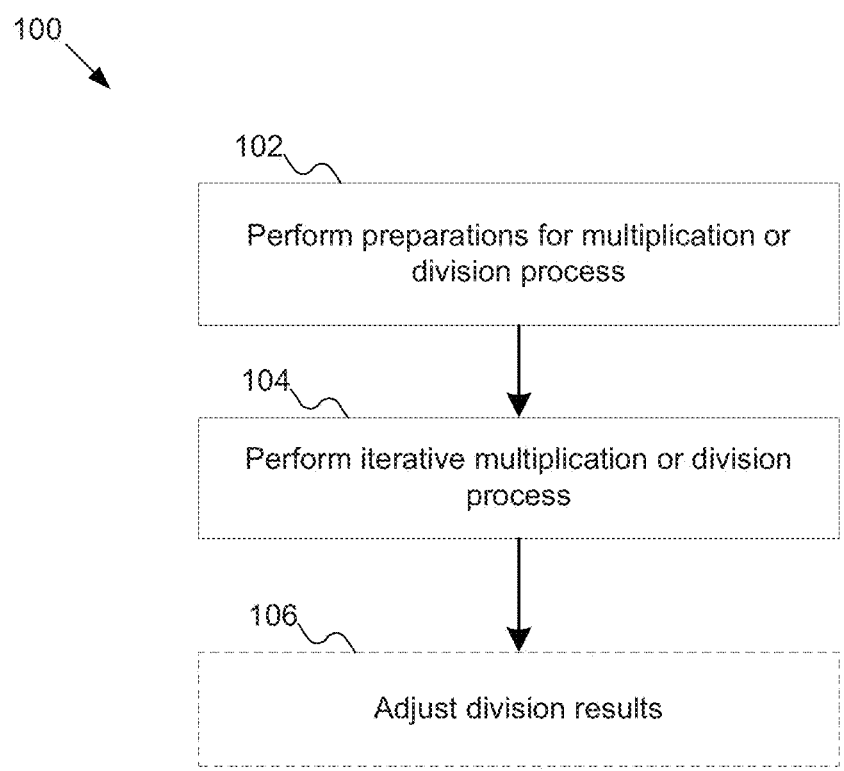
FIG. 1 is a block diagram illustrating an example of a method of operation stages for an integer radix-4 joint multiplication and division device in accordance with embodiments of the disclosed technology.

FIG. 1 is a block diagram illustrating an example of a method 100 of operation stages for an integer radix-4 joint multiplication and division device in accordance with embodiments of the disclosed technology. At the first stage 102, preparations for a multiplication or division process may be performed, such as transforming of inputs, receiving modulo of the divisor, divisor and dividend normalization, determine overflow situation, etc. At the second stage 104, an iterative multiplication or division process may be performed using the radix-4 set (−2, −1, 0, 1, 2). At an optional third stage 106, the results of the division may be adjusted, e.g., balanced.

The following listing includes some of the options for pipelining the three stages 102-106 of a joint multiplication and division device in accordance with embodiments of the disclosed technology:

Option 1—The first stage 102 takes two clock cycles and the third stage 106 takes one clock cycle.

Option 2—The first stage 102 and third stage 106 each take one clock cycle.

Option 3—The first stage 102 takes one clock cycle and the third stage 106 is combined with the second stage 104.

Option 4—The first stage 102 and the third stage 106 are combined with the second stage 104.

The disclosed normalization block may allow for normalization of the dividend and divisor in a single clock cycle, while taking up a small area in comparison with successive normalization blocks. A normalization block is one of the lowest-speed units in critical paths of division devices, e.g., circuits. While use of a progressive normalization block may result in a significant mean normalization time, the footprint would be minimal.

Consider the following, in which x, d, q, and rem will denote the dividend, divisor, quotient, and remainder, respectively, of a division operation:

$$x=q*d+\text{rem}$$

Implementing an integer radix-4 divider based on a quotient digits lookup table should be specific to the dividend and the divisor must be normalized. To normalize an arbitrary dividend and divisor, a normalization factor $\zeta$ may be determined for the normalized divisor ($d*\zeta$). Normalization of the divisor and the dividend generally results in the following:

$$x*\zeta=q*(d*\zeta)+\text{rem}*\zeta, |\text{rem}|*\zeta \le |d|*\zeta-\zeta$$

A normalization block may be used for finding the position of the leading "1" in the modulo of the divisor and shifting the divisor and dividend to the left by a certain amount to the leading "1" that appeared in the most significant bit position. Also, a normalization block may generate a signal that the divisor is equal zero.

Figure 2:
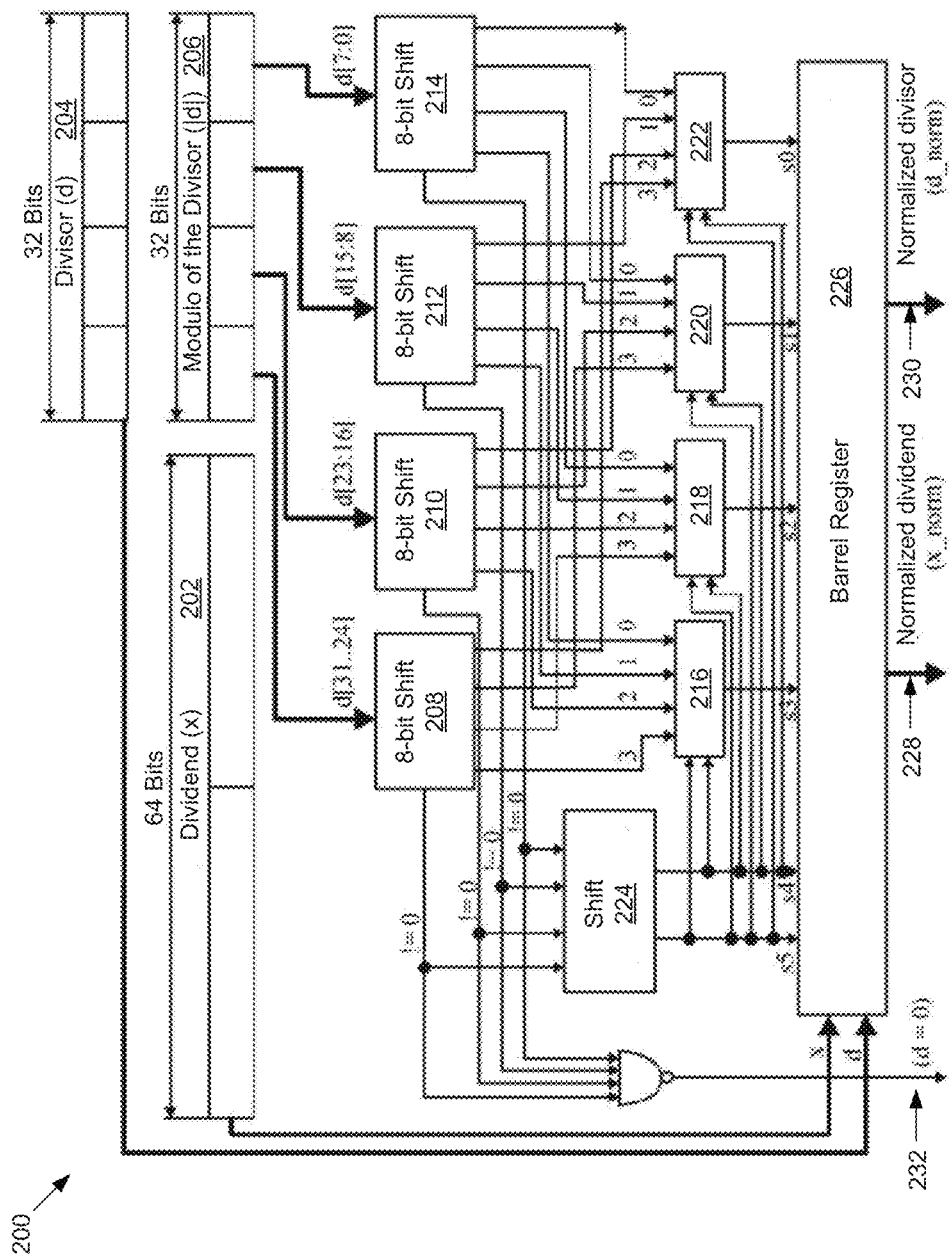
FIG. 2 illustrates an example of a normalization block architecture for up to a 64-bit dividend and up to a 32-bit divisor in accordance with embodiments of the disclosed technology.

FIG. 2 illustrates an example of a normalization block architecture 200 for a 64-bit dividend (x) 202 and a 32-bit divisor (d) 204 in accordance with embodiments of the disclosed technology. A modulo of the divisor (|d|) 206 is transferred into four 8-bit shift registers 208-214, which output to a barrel register 226 by way of four multiplexers 216-220 that, in connection with another shift register 224, transfer into a barrel register 226. The barrel register 226 outputs a normalized dividend (x_norm), as indicated by 228, and a normalized divisor (d_norm), as indicated by 230. A sign that the divisor is equal to zero may be generated, as indicated by 232.

In situations where the dividend (x) is twice as large as the divisor (d), current devices typically perform the division operation on integers in the following range:

Unsigned division: $0 < x \le 2^{2n}-1; 0 < d \le 2^{n}-1$
Signed division: $-2^{2n-1} \le x \le 2^{2n-1}-1; -2^{n-1} \le d \le 2^{n-1}-1$ Division operations often result in overflow, i.e., the quotient exceeds a maximum value. Overflow generally occurs in the following cases for unsigned and signed division:

1. Divisor d is zero. This situation is generally determined based on the result of normalization of the dividend and divisor.
2. Situations where the quotient q and/or remainder rem are outside the following ranges:

| a. Unsigned division: | $0 < q \le 2^n - 1$ |
| --- | --- |
|  | $0 < \text{rem} \le d - 1$ |
| b. Signed division: | $-2^{n-1} \le q \le 2^{n-1} - 1$ |
|  | $-|d| + 1 \le \text{rem} \le |d| - 1$ |

Based on the above, one may consult standard guidelines for determining the result of the overflow situation:

1. Divisor d is zero.
2. Failure to comply with the following conditions:

| a. | Unsigned division: $x < d * 2^n$ |
| --- | --- |
| b. | Signed division: $\begin{cases} |x| < |d|*2^{n-1}, & \text{sign}(x) = \text{sign}(d) \\ |x| < |d|*2^{n-1} + |d|, & \text{sign}(x) \ne \text{sign}(d) \end{cases}$ |

Shortcomings of typical overflow situation detection methods, which greatly increase the hardware resource area and critical path of the divider circuit, include the following:

The need to obtain a modulo of the dividend (x).

Comparison of the absolute value of the dividend in relation to the absolute value of the shifted divisor.

When the dividend and divisor signs do not match, there is a need to compare the absolute value of the dividend and the sum of the absolute value of the divisor with its shifted value.

Certain embodiments of the disclosed technology include methods of determining a situation involving overflow during a division operation that minimize the area occupied by hardware resources and reduce their energy consumption compared to the standard approaches that are widely used at present.

Figure 3:
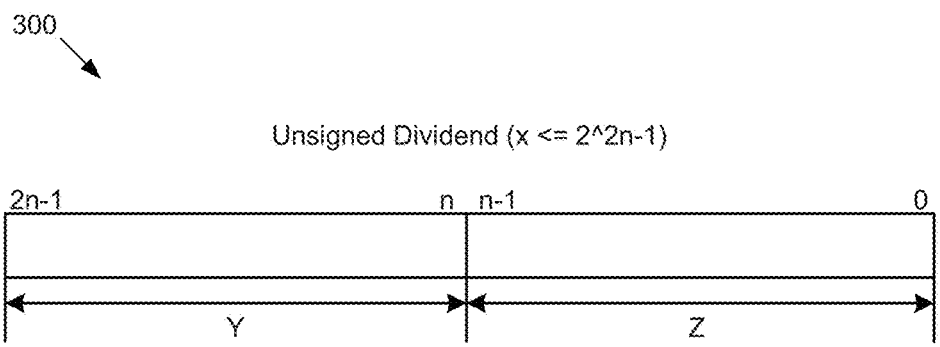
FIG. 3 illustrates an example of separating an unsigned dividend into two parts in connection with an overflow detection technique in accordance with embodiments of the disclosed technology.
Figure 4:
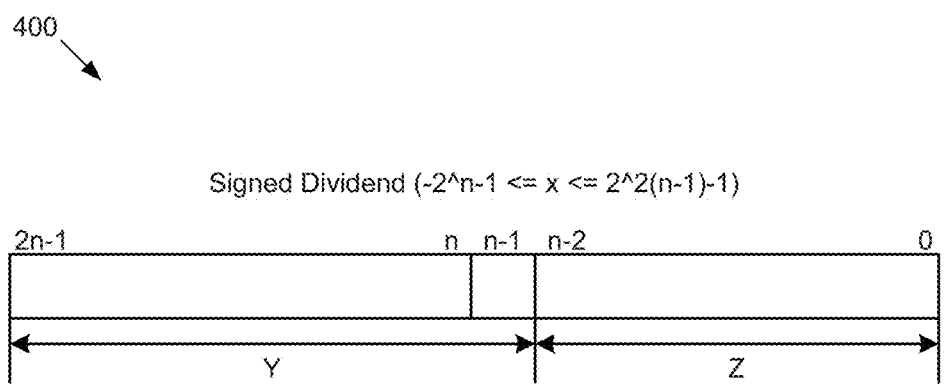
FIG. 4 illustrates an example of separating a signed dividend into two parts in connection with an overflow detection technique in accordance with embodiments of the disclosed technology.

FIG. 3 illustrates an example 300 of separating an unsigned dividend into two parts (Y and Z) in connection with an overflow detection technique in accordance with embodiments of the disclosed technology. FIG. 4 illustrates an example 400 of separating a signed dividend into two parts (Y and Z) in connection with an overflow detection technique in accordance with embodiments of the disclosed technology. The positions of Y and Z depend on whether the dividend is unsigned or signed. Depending on the signs of the dividend (x) and the divisor (d), detection of an overflow situation may be determined based on the following equations:

$$x \ge 0, d \ge 0 \rightarrow K = Y - d \quad \quad 1$$
$$\begin{cases} K < 0, & \text{No overflow} \\ K \ge 0, & \text{Overflow.} \end{cases}$$

$$x < 0, d \ge 0 \rightarrow K = \text{inversion}(Y) - d \quad \quad 2$$
$$\begin{cases} K < 0, & \text{No overflow} \\ K = 0, & \text{Special case} \\ K > 0, & \text{Overflow} \end{cases}$$

$$\text{Special case:} \begin{cases} Z + d > 0, & \text{No overflow} \\ Z + d \le 0, & \text{Overflow.} \end{cases}$$

$$x \geq 0, d < 0 \to K = Y + d \qquad 3$$

$$\begin{cases} K < 0, & \text{No overflow} \\ K = 0, & \text{Special case} \\ K > 0, & \text{Overflow} \end{cases}$$

$$\text{Special case: } \begin{cases} Z + d < 0, & \text{No overflow} \\ Z + d \geq 0, & \text{Overflow.} \end{cases}$$

$$x < 0, d < 0 \to K = Y - d \qquad 4$$

$$\begin{cases} K > 0, & \text{No overflow} \\ K = 0, & \text{Special case} \\ K < 0, & \text{Overflow} \end{cases}$$

$$\text{Special case: } \begin{cases} Z \neq 0, & \text{No overflow} \\ Z = 0, & \text{Overflow.} \end{cases}$$

In the case of the first equation, where the values of the dividend (x) and divisor (d) are each greater than or equal to zero, the value of K is determined by subtracting d from Y. If the value of K is less than zero, the resulting determination is that there is no overflow situation. If the value of K is greater than or equal to zero, the resulting determination is that an overflow situation has occurred.

In the case of the second equation, where the value of the dividend (x) is less than zero and the value of the divisor (d) is greater than or equal to zero, the value of K is determined by first taking the inversion of Y and then subtracting d from the inversion of Y. If the value of K is less than zero, the resulting determination is that there is no overflow situation. If the value of K is determined to be greater than zero, the resulting determination is that an overflow situation has occurred. If the value of K is zero, d is added to Z. If the resulting value is greater than zero, then the determination is that there is no overflow situation. If the resulting value is less than or equal to zero, then the determination is that an overflow situation has occurred.

In the case of the third equation, where the value of the dividend (x) is greater than or equal to zero and the value of the divisor (d) is less than zero, the value of K is determined by adding d to Y. If the value of K is less than zero, the resulting determination is that there is no overflow situation. If the value of K is greater than zero, the resulting determination is that an overflow situation has occurred. If the value of K is zero, d is added to Z. If the resulting value is less than zero, then the determination is that there is no overflow situation. If the resulting value is greater than or equal to zero, then the determination is that an overflow situation has occurred.

In the case of the fourth equation, where the values of the dividend (x) and divisor (d) are each less than zero, the value of K is determined by subtracting d from Y. If the value of K is greater than zero, the resulting determination is that there is no overflow situation. If the value of K is less than zero, the resulting determination is that an overflow situation has occurred. If the value of K is zero, the value of Z is analyzed. If the value is greater than or less than zero, then the determination is that there is no overflow situation. If the value is equal to zero, then the determination is that an overflow situation has occurred.

Figure 5:
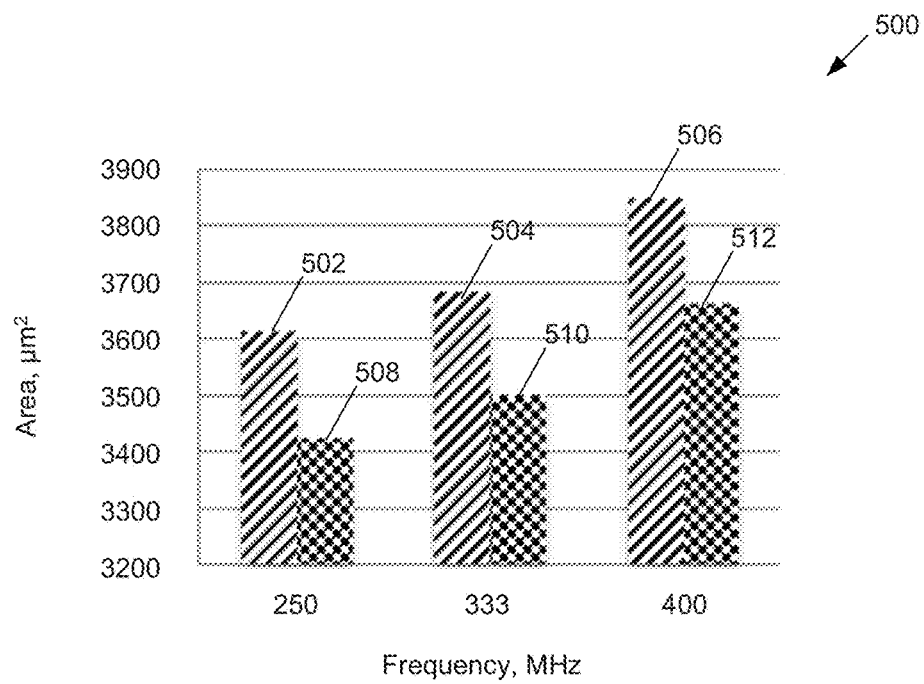
FIG. 5 is a bar graph illustrating a comparison at three different frequencies of the area required for components of a current division device to components utilized in embodiments of the disclosed technology for detection of overflow situations during division operations.

FIG. 5 is a bar graph 500 illustrating a comparison at three different frequencies (250 MHz, 333 MHz, and 400 MHz) of the area required for components of a current division device, as indicated by 502-506, to components utilized in embodiments of the disclosed technology for detecting overflow situations during division operations, as indicated by 508-512. As can be ascertained from the graph 500, hardware implementations for overflow situations in accordance with the disclosed technology may take, on average, 5.1% less space than current devices.

Figure 6:
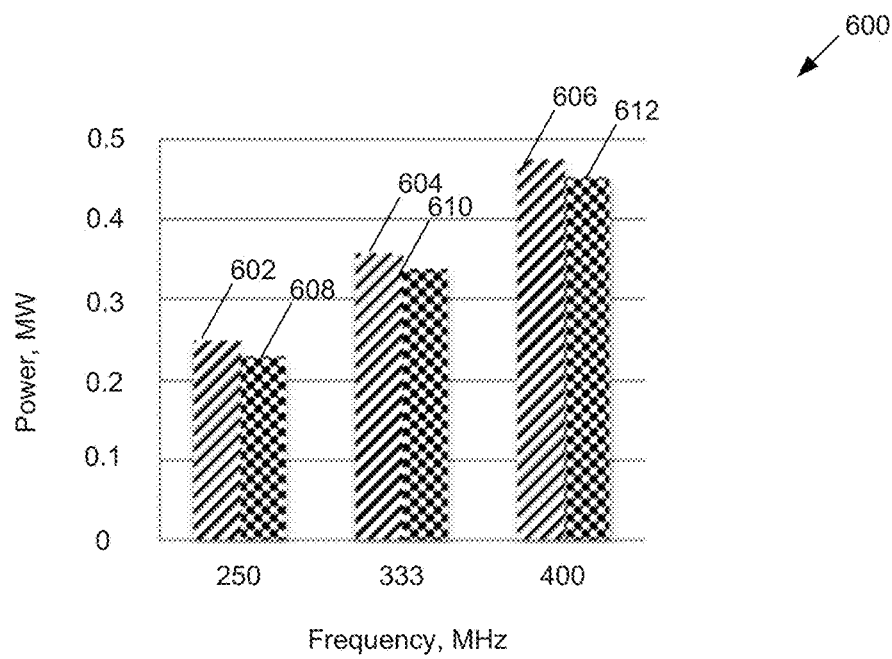
FIG. 6 is a bar graph illustrating a comparison at three different frequencies of power consumption for components of a current division device to components utilized in embodiments of the disclosed technology for detection of overflow situations during division operations.

FIG. 6 is a bar graph 600 illustrating comparisons at three different frequencies (250 MHz, 333 MHz, and 400 MHz) of power consumption for components of a current division device, as indicated by 602-606, to components utilized in embodiments of the disclosed technology for detecting overflow situations during division operations, as indicated by 608-612. As can be ascertained from the graph 600, hardware implementations for overflow situations in accordance with the disclosed technology may consume, on average, 7.8% less power than current devices.

In joint multiplication and division circuits, multiplication and division sub-circuits tend to share data paths. However, there are also sub-blocks that are privately used by a division sub-circuit, e.g., a quotient lookup table, and by a multiplication sub-circuit, e.g., a booth encoder. Certain embodiments of the disclosed technology include a unified computation unit for iterative multiplication and division that may, at certain times, perform only multiplication or division operations. However, circuit area and power consumption are comparable to a circuit that is configured to perform only one function, e.g., an integer radix-4 multiplication or division circuit.

Figure 7A:
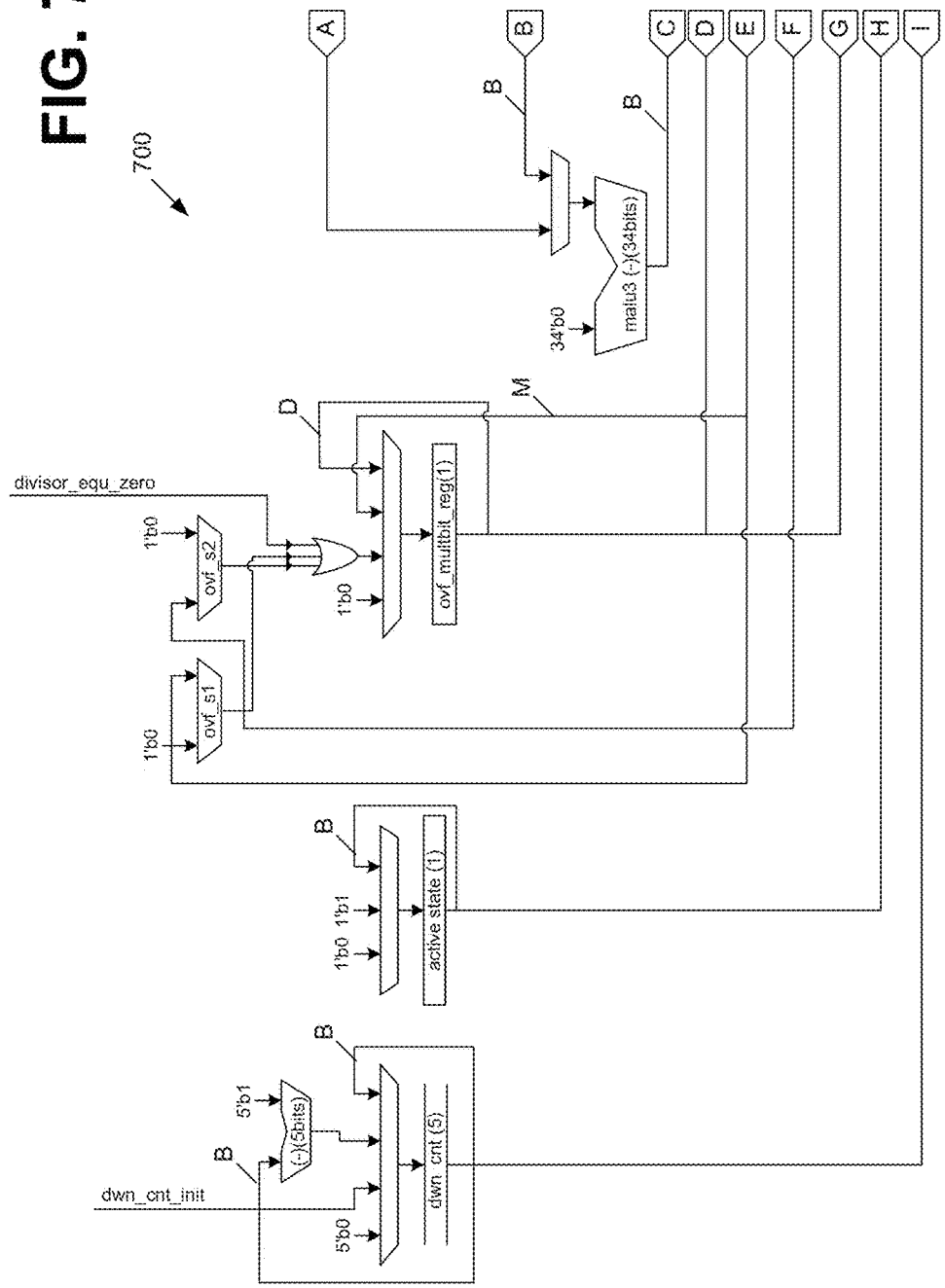
FIG. 7 illustrates an example utilization of data path of a unified computation unit for iterative multiplication and division in accordance with certain embodiments of the disclosed technology.
Figure 7B:
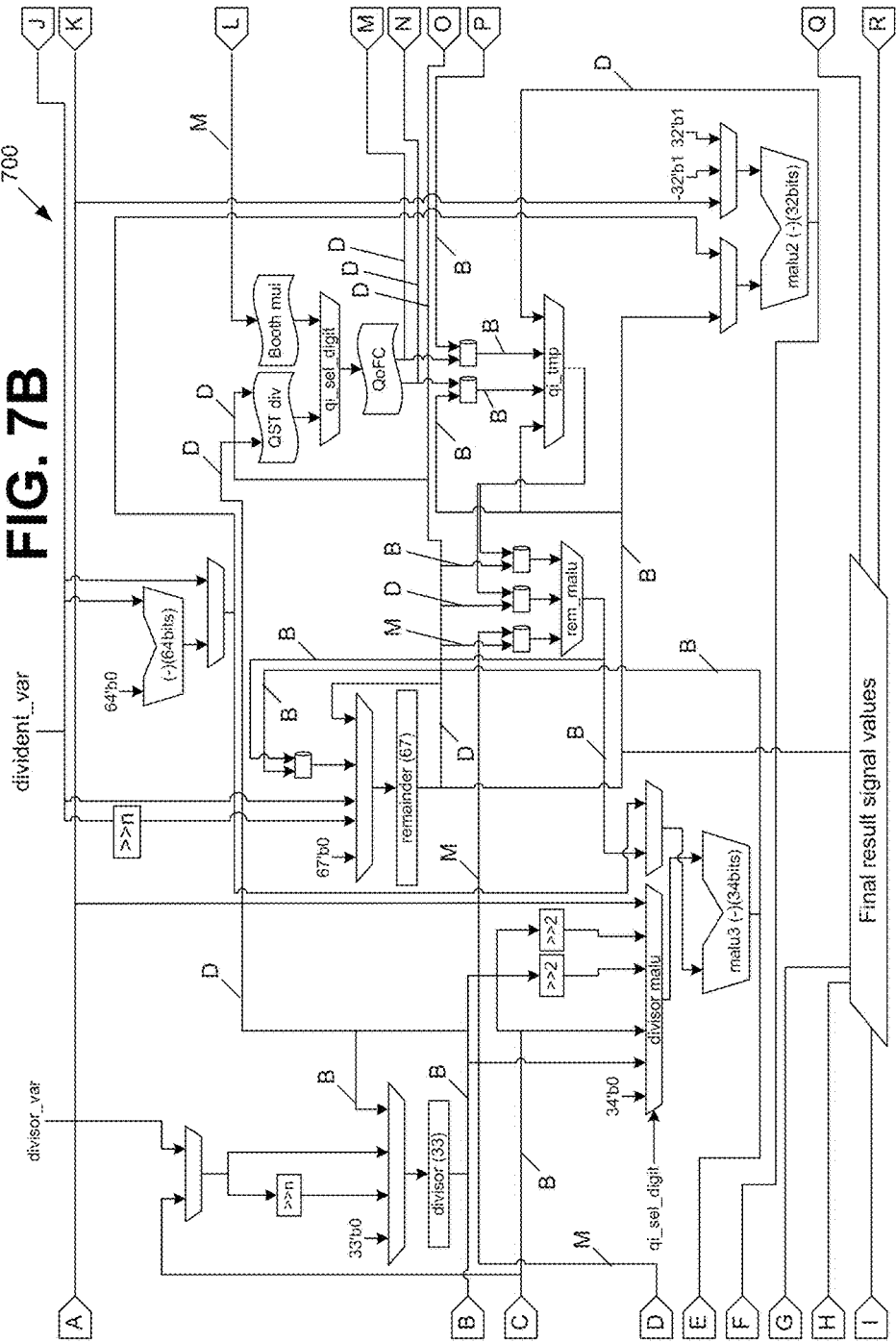
Figure 7C:
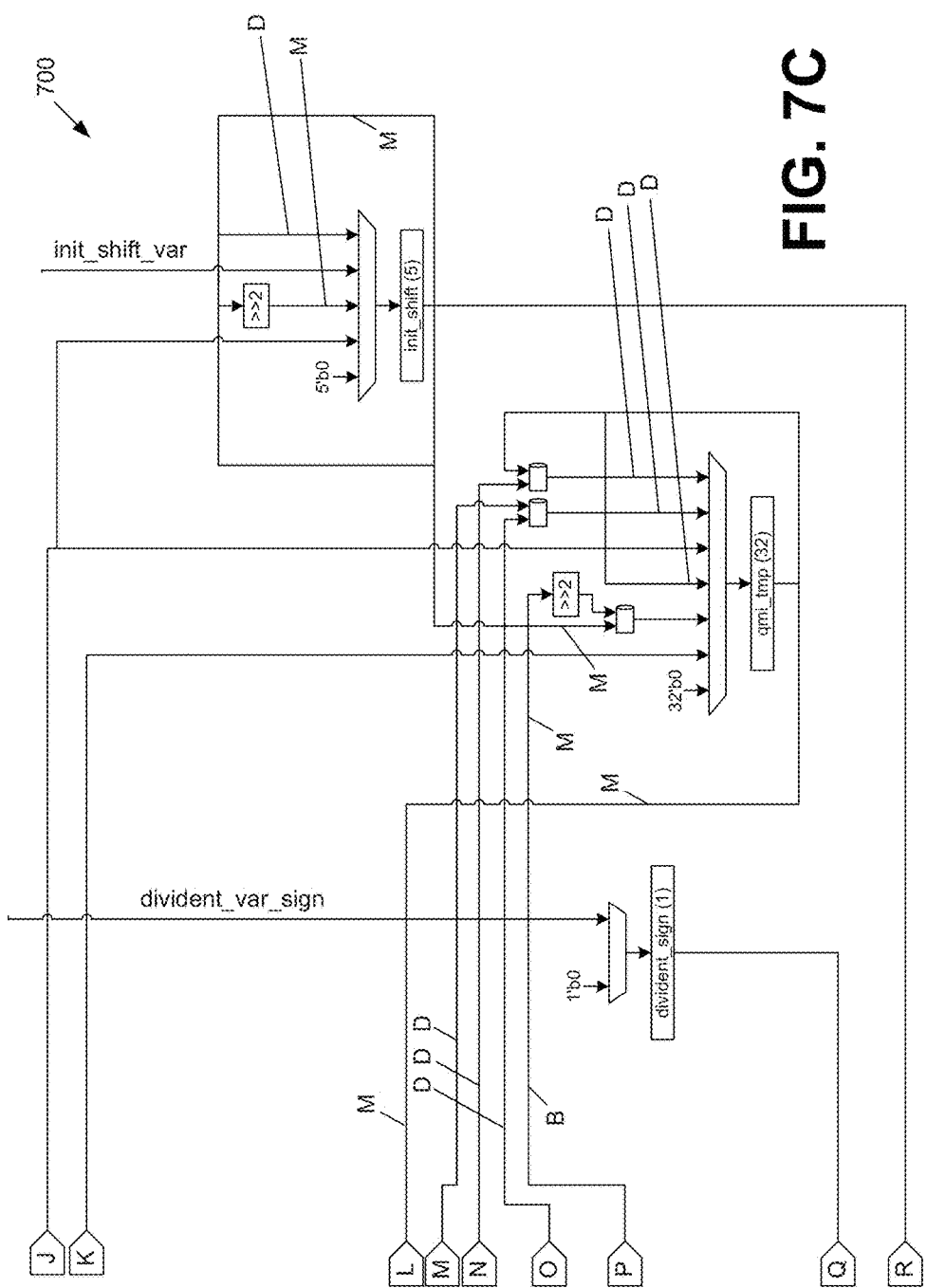

FIG. 7 illustrates an example utilization of data path of a unified computation unit 700 for iterative multiplication and division operations in accordance with certain embodiments of the disclosed technology. The computation unit 700 includes several wires that may be used in both multiplication and division operations, as indicated by the label "B" for "both," wires that are to be used only for multiplication operations, as indicated by the label "M" for "multiplication-only," and wires that are to be used only for division operations, as indicated by "D" for "division-only."

Figure 8:
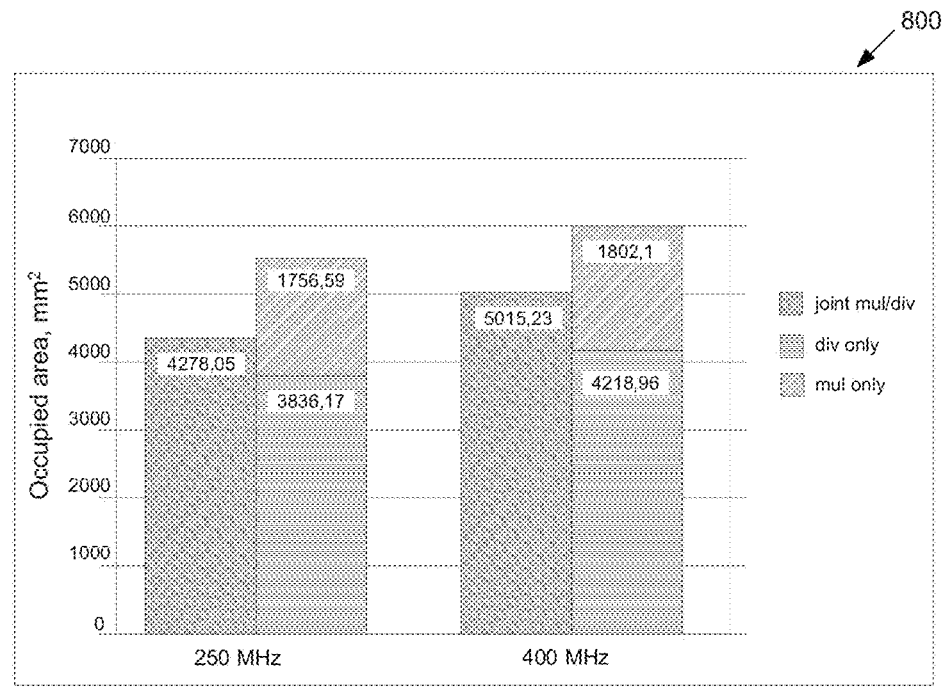
FIG. 8 is a bar graph comparing at two different frequencies the footprint, e.g., amount of occupied area, for components of an integer radix-4 division or multiplication circuit to that for components of a unified computation unit for iterative multiplication and division in accordance with certain embodiments of the disclosed technology.

FIG. 8 is a bar graph 800 comparing at two different frequencies (250 MHz and 400 MHz) the footprint, e.g., amount of occupied area, for components of an integer radix-4 division or multiplication circuit to that for components of a unified computation unit for iterative multiplication and division in accordance with certain embodiments of the disclosed technology.

Figure 9:
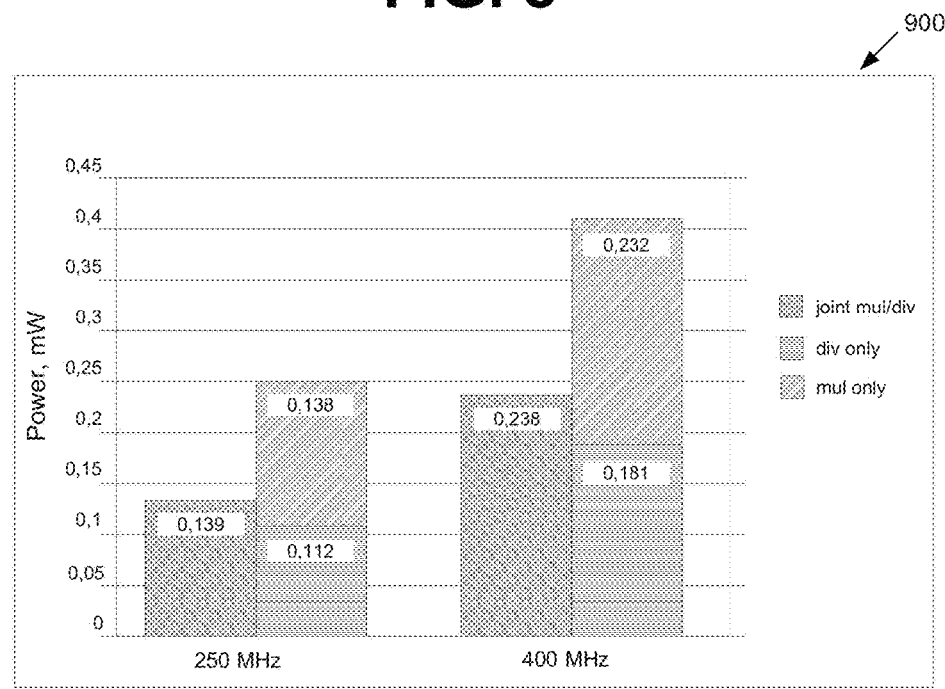
FIG. 9 is a bar graph comparing at two different frequencies the estimated power consumption for components of an integer radix-4 division or multiplication circuit to that for components of a unified computation unit for iterative multiplication and division in accordance with certain embodiments of the disclosed technology.

FIG. 9 is a bar graph 900 comparing at two different frequencies (250 MHz and 400 MHz) the estimated power consumption for components of an integer radix-4 division or multiplication circuit to that for components of a unified computation unit for iterative multiplication and division in accordance with certain embodiments of the disclosed technology.

Figure 10:
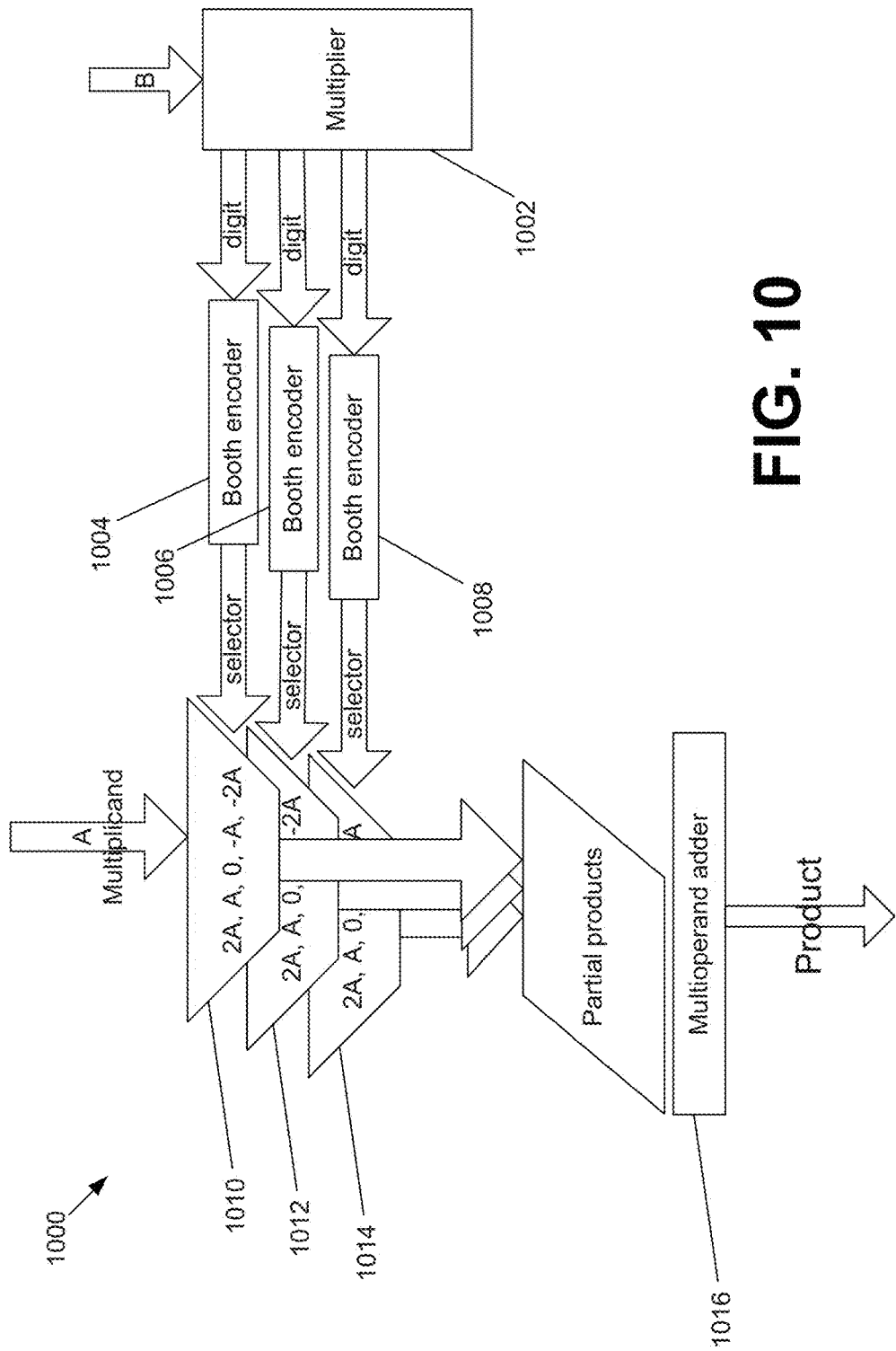
FIG. 10 illustrates an example of a high-radix Booth encoding-based multiplier architecture that includes a high-radix Booth encoder, multiplexers (for partial products selection), multi-operand addition tree and final adder.

FIG. 10 illustrates an example of a high-radix Booth encoding-based multiplier circuit 1000 that includes input 1002, multiple Booth encoders 1004-1008, multiplexers 1010-1014 (for partial products selection), a multi-operand addition tree and final adder 1016. The multi-operand addition tree can be configured to balance the output delays of full adders so as to reduce critical path.

An addition tree generally requires a final adder because it cannot fully compress operands itself; rather, it can only do compressions for the last two operands. In situations where certain bits of the second operand always contains zero, however, the final adder may be simplified. Because embodiments of the disclosed technology produce more always-zero values in certain bits of the second operand of the final adder, the final addition can be completed faster.

Also, because the final addition tends to contribute significantly to the overall multiplication time, the multiplier tends to perform faster as well.

Figure 11:
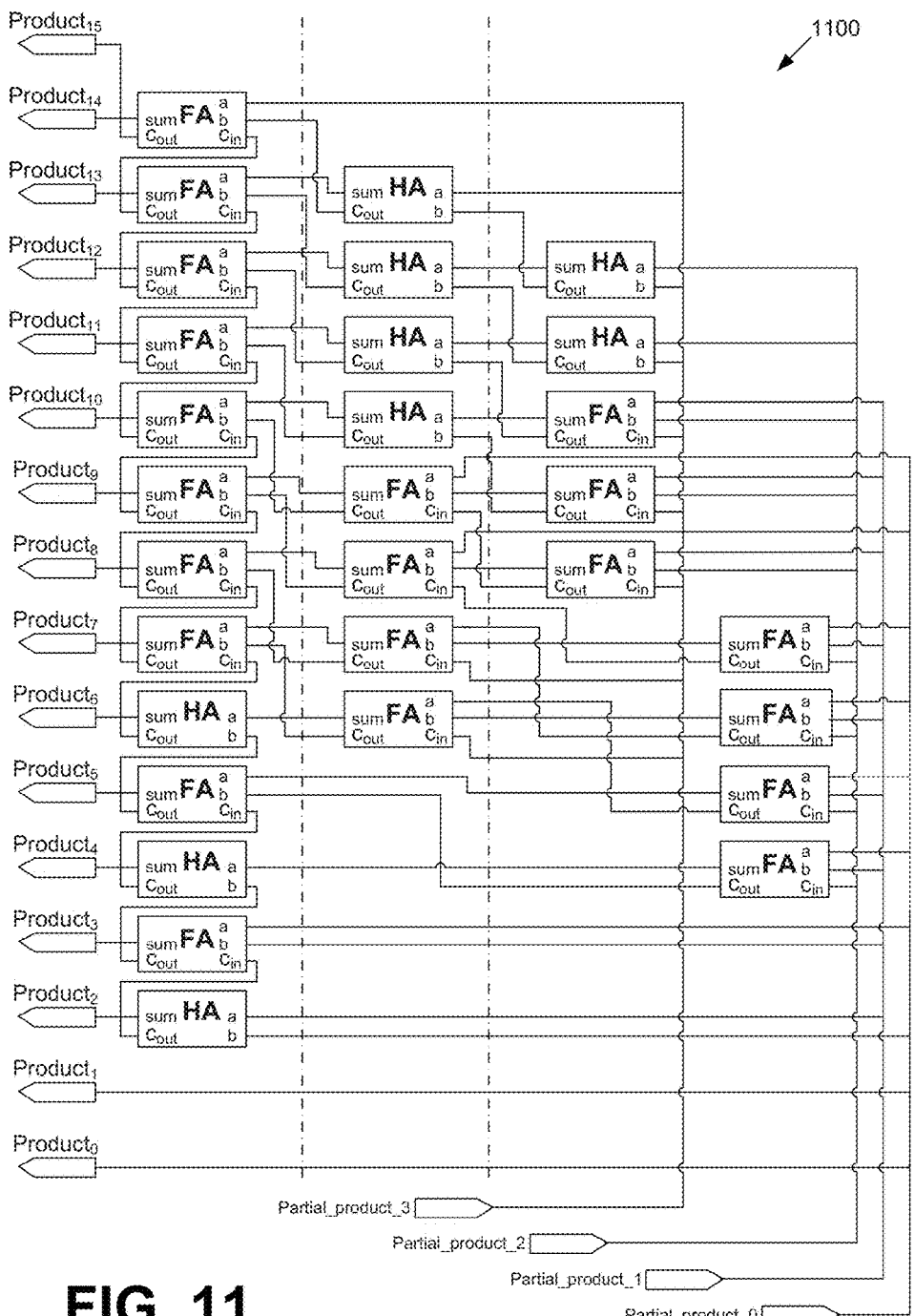
FIG. 11 illustrates an example of a classical Wallace tree schema.
Figure 12:
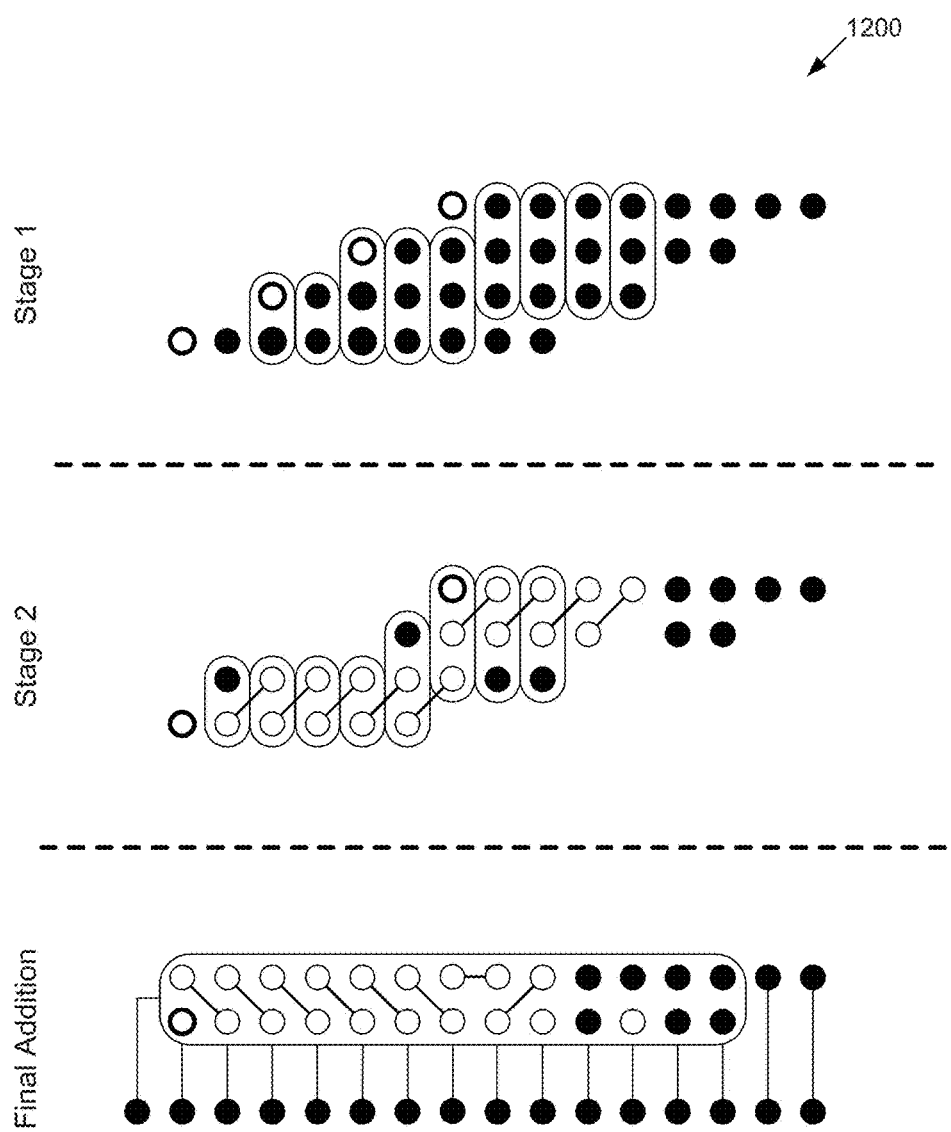
FIG. 12 is a reduction scheme corresponding to the Wallace tree schema of FIG. 11 that demonstrates how partial products compression may progress with each layer of the schema.

FIG. 11 illustrates an example of a classical Wallace tree schema 1100 that includes a number of full adders, each of which are labeled "FA," and a few half adders, each of which are labeled "HA." FIG. 12 is a reduction scheme 1200 corresponding to the Wallace tree schema 1100 of FIG. 11. The Wallace tree schema 1100 includes two stages (Stage 1 and Stage 2) and a final addition, as illustrated by the reduction scheme 1200 of FIG. 12.

Figure 13A:
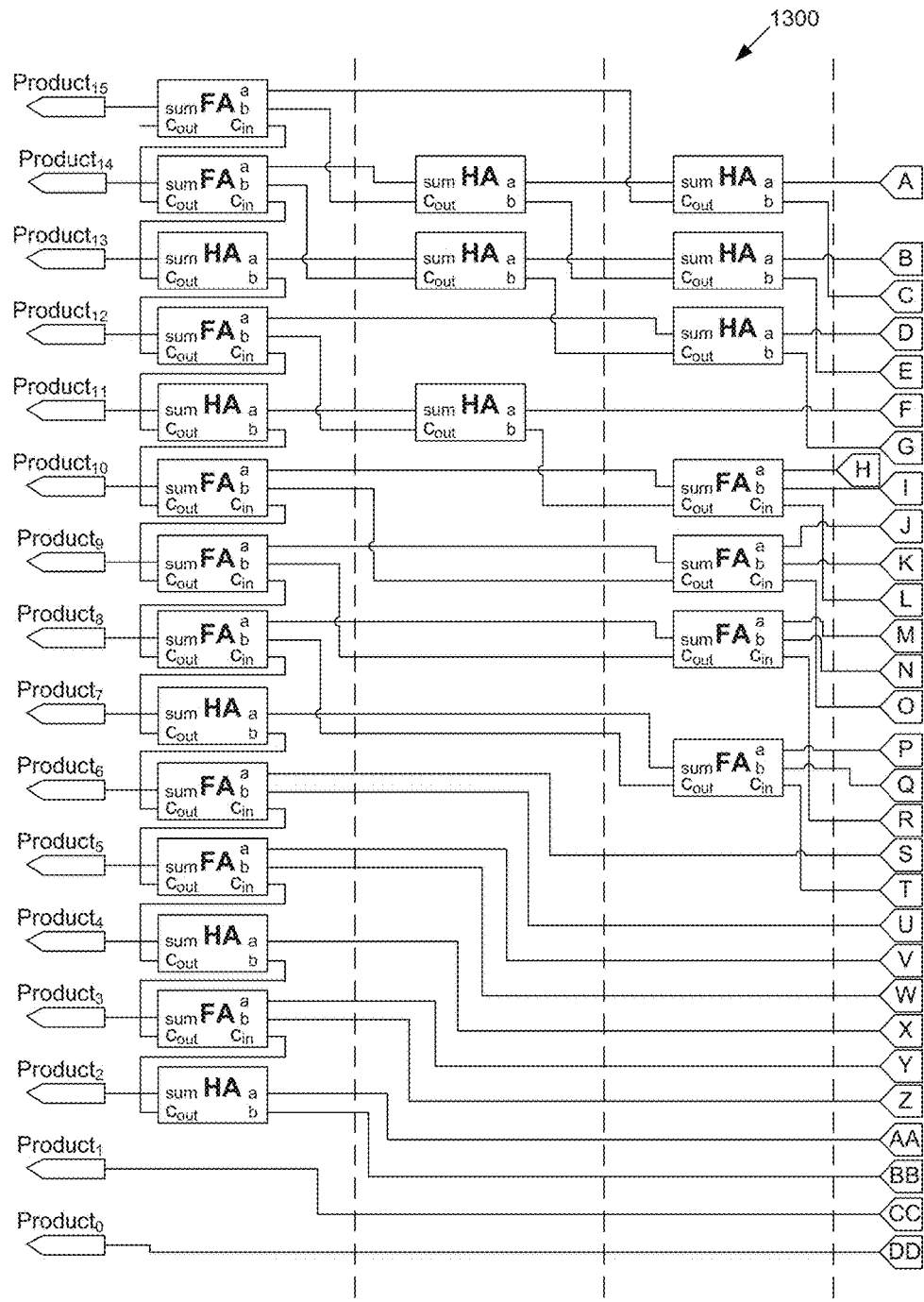
FIG. 13 illustrates an example of a tree-based addition schema in accordance with certain embodiments of the disclosed technology.
Figure 13B:
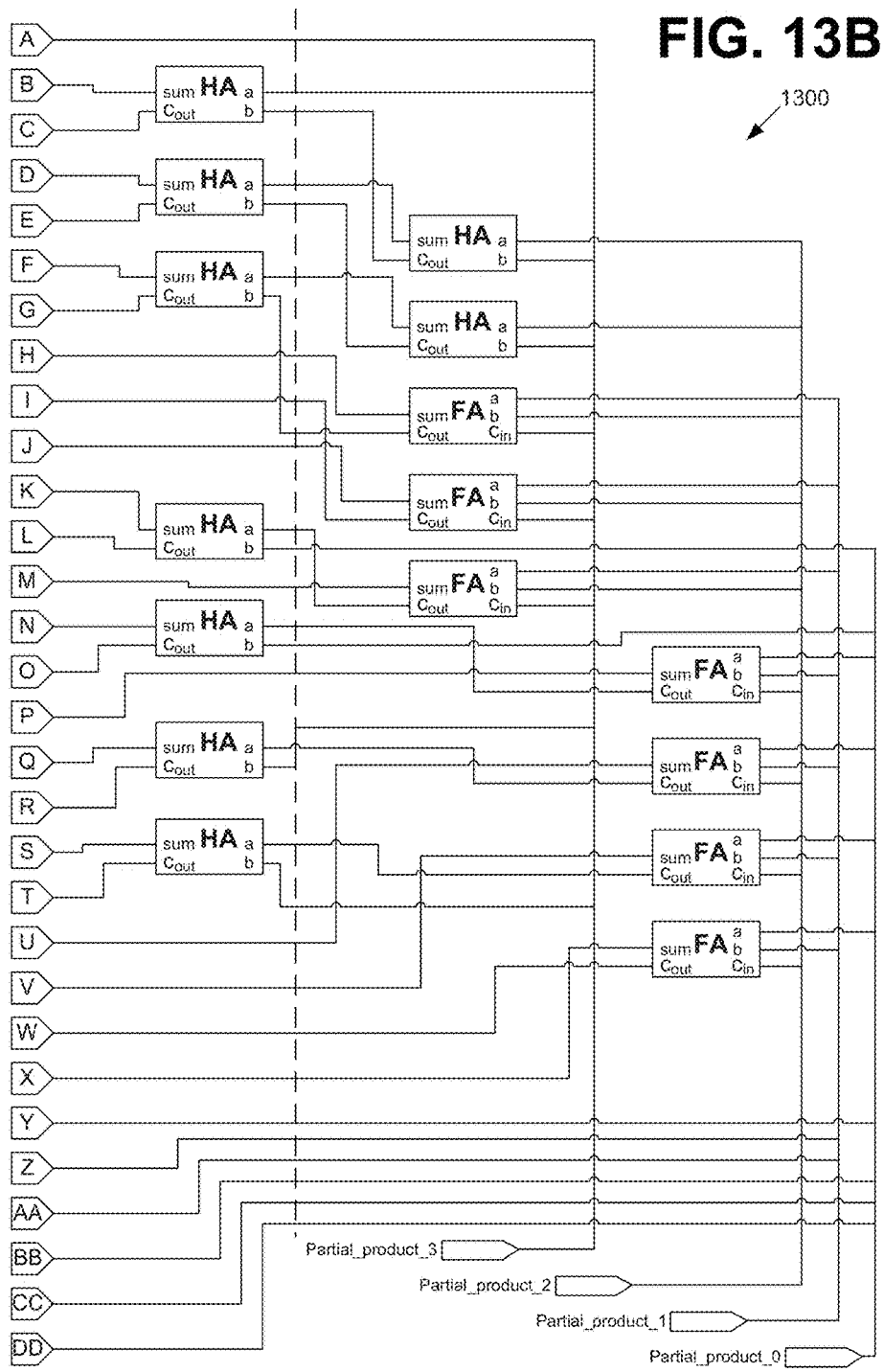
Figure 14:
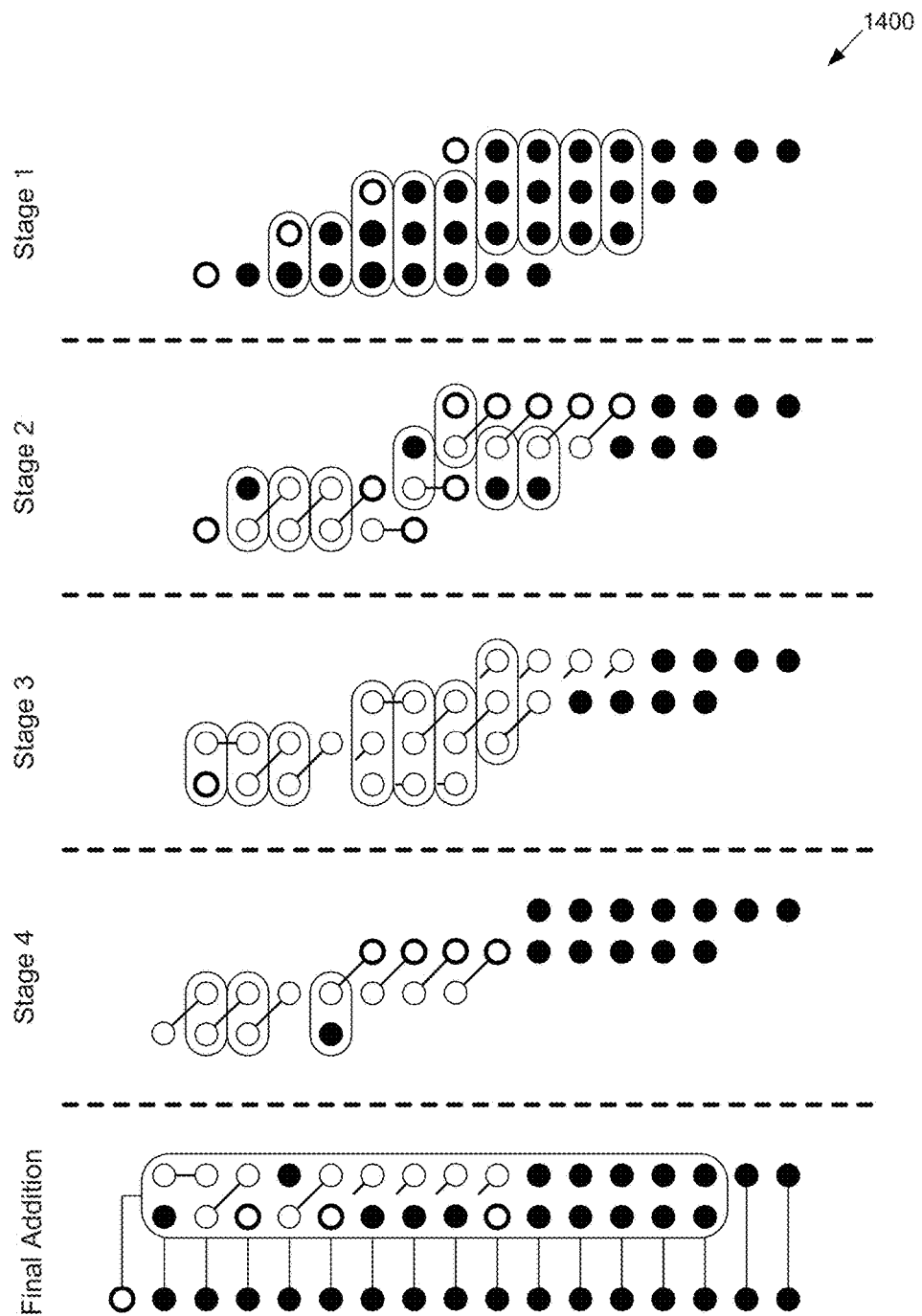
FIG. 14 is a reduction scheme corresponding to the tree-based addition schema of FIG. 13 that demonstrates how partial products compression may progress with each layer of the schema.

FIG. 13 illustrates an example of a tree-based addition schema 1300 in accordance with certain embodiments of the disclosed technology. The schema 1300 includes a number of full adders, each of which are labeled "FA," and a notably more half adders, each of which are labeled "HA," than are used in the Wallace tree schema 1100 of FIG. 11. FIG. 14 is a reduction scheme 1400 corresponding to the schema 1300 of FIG. 13.

The schema 1300 uses the difference in the full adder output delays. That is, while sum outputs are still being processed, carry outputs (which are faster) can be compressed with half-adders to produce inputs for the following layer when sum outputs are ready. So, more additions can be performed within one layer delay (at the cost of additional half-adders and more complicated interconnect).

Whereas current circuits typically balance output delays of full adders, embodiments of the disclosed technology, such as the schema 1300 of FIG. 13, consider performing as many additions in a layer and as soon as possible. Also, instead of focusing on reducing critical path of the addition tree separately as is typically done in current systems, embodiments of the disclosed technology focuses on producing a better input to the final adder to reduce critical path of the overall schema. Because the final adder is such a significant component of the overall scheme, this approach greatly enhances the overall scheme performance.

Although specific embodiments have been illustrated and described herein, it will be appreciated by those of ordinary skill in the art that a wide variety of alternate and/or equivalent implementations may be substituted for the specific embodiments shown and described without departing from the scope of the embodiments of the disclosed technology. This application is intended to cover any adaptations or variations of the embodiments illustrated and described herein. Therefore, it is manifestly intended that embodiments of the disclosed technology be limited only by the following claims and equivalents thereof.

What is claimed is:

1. A method, comprising:
    receiving, by a hardware division overflow detection circuit, a size, sign, and value of a dividend x for a division operation as a part of an instruction;
    receiving, by the hardware division overflow detection circuit, a size, sign, and value of a divisor d for the division operation as a part of the instruction; and
    executing the instruction, by the hardware division overflow detection circuit, by:
        separating the dividend x into a first part Y and a second part Z based on the sign of the dividend x and the sign of the divisor d; and
        evaluating whether an overflow situation for the division operation exists by:
            when the dividend x and the divisor d are each greater than or equal to zero, generating a first K value by subtracting the dividend x from the first part Y, determining that no overflow situation exists when the first K value is less than zero, and determining that an overflow situation does exist when the first K value is greater than or equal to zero;
            when the dividend x is less than zero and the divisor d is greater than or equal to zero, generating a second K value by subtracting the dividend x from an inversion of the first part Y, determining that no overflow situation exists when the second K value is less than zero, determining that an overflow situation does exist when the second K value is greater than or equal to zero, and determining that special processing is to be conducted when the second K value equals zero;
            when the dividend x is greater than or equal to zero and the divisor d is less than zero, generating a third K value by adding the dividend x to the first part Y, determining that no overflow situation exists when the third K value is less than zero, and determining that an overflow situation does exist when the third K value is greater than or equal to zero, and determining that special processing is to be conducted when the third K value equals zero; and
            when the dividend x and the divisor d are each less than zero, generating a fourth K value by subtracting the dividend x from the first part Y, determining that no overflow situation exists when the fourth K value is less than zero, determining that an overflow situation does exist when the fourth K value is greater than or equal to zero, and determining that special processing is to be conducted when the fourth K value equals zero.

2. The method of claim 1, wherein the division operation comprises a 64-bit-to-32-bit division, a 32-bit-to-16-bit division, or a 16-bit-to-8-bit division.

3. The method of claim 1, wherein the evaluating is based on a value obtained by subtracting the divisor d from the first part Y if the dividend x has a value that is greater than or equal to zero and the divisor d has a value that is greater than or equal to zero.

4. The method of claim 3, wherein the evaluating comprises determining that the overflow situation exists responsive to a determination that the value obtained by subtracting the divisor d from the first part Y if the dividend x is greater than or equal to zero.

5. The method of claim 1, wherein the evaluating is based on a value obtained by calculating an inversion of the first part Y and subtracting the divisor d from the inversion of the first part Y if the dividend x has a value that is less than zero and the divisor d has a value that is greater than or equal to zero.

6. The method of claim 5, wherein the evaluating comprises determining that the overflow situation exists responsive to a determination that the value obtained by subtracting the divisor d from the inversion of the first part Y is greater than zero.

7. The method of claim 5, wherein the evaluating is further based on another value obtained by adding the divisor d to the second part Z.

8. The method of claim 7, wherein the evaluating comprises determining that the overflow situation exists responsive to a determination that the other value is less than or equal to zero.

9. The method of claim 1, wherein the evaluating is based on a value obtained by adding the divisor d to the first part Y responsive to a determination that the dividend x has a value that is greater than or equal to zero and the divisor d has a value that is less than zero.

10. The method of claim 9, wherein the evaluating comprises determining that the overflow situation exists responsive to a determination that the value obtained by adding the divisor d to the first part Y is greater than zero.

11. The method of claim 9, wherein the evaluating is further based on another value obtained by adding the divisor d to the second part Z.

12. The method of claim 11, wherein the evaluating comprises determining that the overflow situation exists responsive to a determination that the other value is greater than or equal to zero.

13. The method of claim 1, wherein the evaluating is based on a value obtained by subtracting the divisor d from the first part Y responsive to a determination that the dividend x has a value that is less than zero and the divisor d has a value that is less than zero.

14. The method of claim 13, wherein the evaluating comprises determining that the overflow situation exists responsive to a determination that the value obtained by subtracting the divisor d from the first part Y is less than zero.

15. The method of claim 13, wherein the evaluating is further based on whether the second part Z has a value of zero, and wherein the evaluating comprises determining that the overflow situation exists responsive to a determination that the value of the second part Z is zero.

16. The method of claim 1, wherein at least one of area occupied by and energy consumed by the hardware division overflow detection circuit is to be minimized by avoiding at least one of:
obtaining a modulo of the dividend;
comparing an absolute value of the dividend in relation to an absolute value of a shifted divisor; and
comparing the absolute value of the dividend and a sum of an absolute value of the divisor and the shifted divisor.

17. The method of claim 1, wherein executing the instruction, by the hardware division overflow detection circuit, further comprises, when it has been determined that no overflow situation exists, performing the division operation, and, when it has been determined that special processing is to be conducted, determining whether the overflow situation exists based on an analysis of the second part Z and the divisor d.

18. An apparatus comprising a hardware division overflow detection circuit to:
receive a size, sign, and value of a dividend x and a divisor d for a division operation as a part of an instruction; and
execute the instruction by:
separating the dividend x into a first part Y and a second part Z based on the sign of the dividend x and the sign of the divisor d;
evaluating whether an overflow situation for the division operation exists by:
when the dividend x and the divisor d are each greater than or equal to zero, generating a first K value by subtracting the dividend x from the first part Y, determining that no overflow situation exists when the first K value is less than zero, and determining that an overflow situation does exist when the first K value is greater than or equal to zero;
when the dividend x is less than zero and the divisor d is greater than or equal to zero, generating a second K value by subtracting the dividend x from an inversion of the first part Y, determining that no overflow situation exists when the second K value is less than zero, determining that an overflow situation does exist when the second K value is greater than or equal to zero, and determining that special processing is to be conducted when the second K value equals zero;
when the dividend x is greater than or equal to zero and the divisor d is less than zero, generating a third K value by adding the dividend x to the first part Y, determining that no overflow situation exists when the third K value is less than zero, and determining that an overflow situation does exist when the third K value is greater than or equal to zero, and determining that special processing is to be conducted when the third K value equals zero; and
when the dividend x and the divisor d are each less than zero, generating a fourth K value by subtracting the dividend x from the first part Y, determining that no overflow situation exists when the fourth K value is less than zero, determining that an overflow situation does exist when the fourth K value is greater than or equal to zero, and determining that special processing is to be conducted when the fourth K value equals zero.

19. The apparatus of claim 18, wherein the division operation comprises a 64-bit-to-32-bit division, a 32-bit-to-16-bit division, or a 16-bit-to-8-bit division.

20. The apparatus of claim 18, wherein the evaluating is based on a value obtained by subtracting the divisor d from the first part Y if the dividend x has a value that is greater than or equal to zero and the divisor d has a value that is greater than or equal to zero.

21. The apparatus of claim 20, wherein the evaluating comprises determining that the overflow situation exists responsive to a determination that the value obtained by subtracting the divisor d from the first part Y if the dividend x is greater than or equal to zero.

22. The apparatus of claim 18, wherein the evaluating is based on a value obtained by calculating an inversion of the first part Y and subtracting the divisor d from the inversion of the first part Y if the dividend x has a value that is less than zero and the divisor d has a value that is greater than or equal to zero.

23. The apparatus of claim 22, wherein the evaluating comprises determining that the overflow situation exists responsive to a determination that the value obtained by subtracting the divisor d from the inversion of the first part Y is greater than zero.

24. The apparatus of claim 22, wherein the evaluating is further based on another value obtained by adding the divisor d to the second part Z.

* * * * *